(No Model.)
A. BOWIE.
CAR TRANSPORTATION CARRIAGE.
No. 498,739. Patented May 30, 1893.
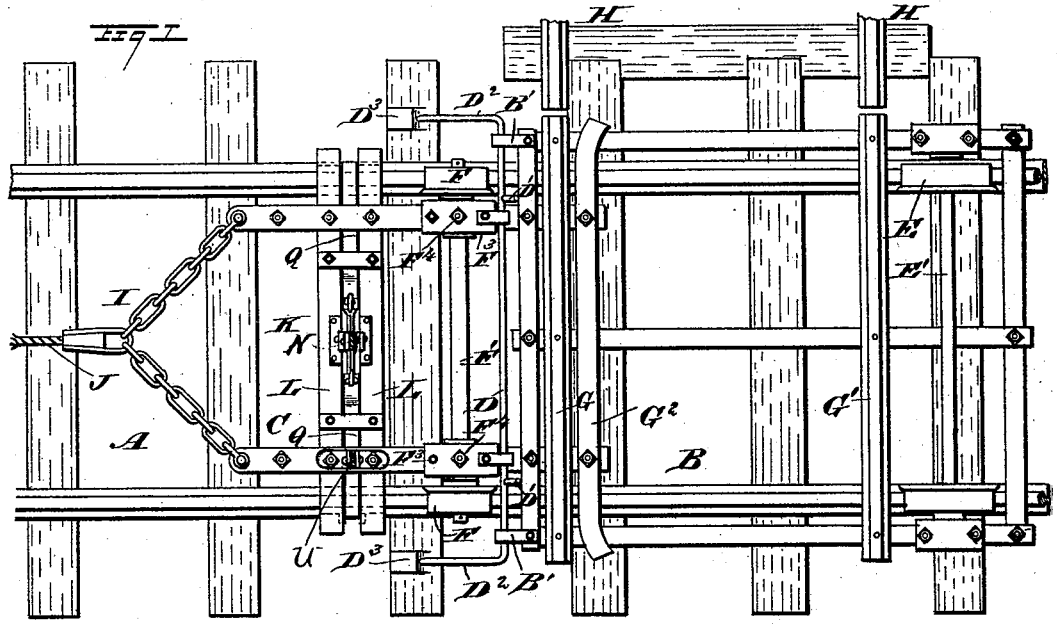
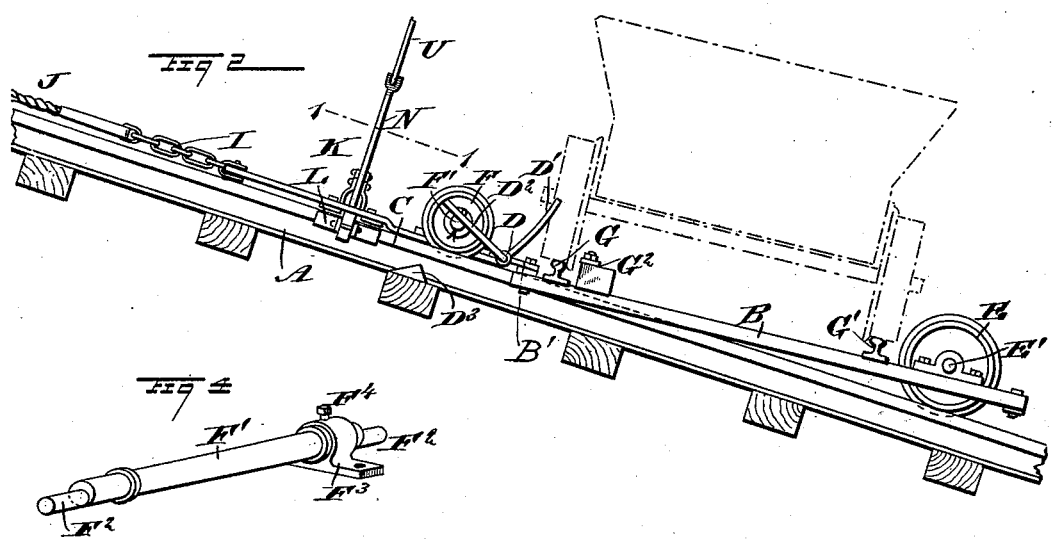
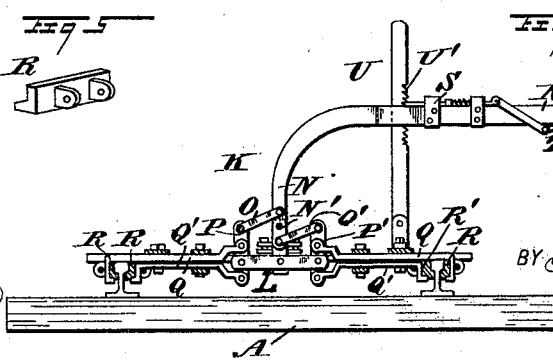
WITNESSES.
H. Walker
C. Sedgwick
INVENTOR:
A. Bowie
BY Munn & Co
ATTORNEYS

UNITED STATES PATENT OFFICE.

ALEXANDER BOWIE, OF GALLUP, TERRITORY OF NEW MEXICO.

CAR-TRANSPORTATION CARRIAGE.

SPECIFICATION forming part of Letters Patent No. 498,739, dated May 30, 1893.

Application filed November 28, 1891. Renewed May 5, 1893. Serial No. 473,146. (No model.)

*To all whom it may concern:*

Be it known that I, ALEXANDER BOWIE, of Gallup, in the county of Bernalillo and Territory of New Mexico, have invented a new and Improved Car-Transportation Carriage, of which the following is a full, clear, and exact description.

The invention relates to gravity plane railroads, and its object is to provide a new and improved car transportation carriage adapted to travel on the inclined track and arranged to receive a car from a side track for transportation on the plane.

The invention consists of certain parts and details and combinations of the same, as will be hereinafter described and claimed.

Reference is to be had to the accompanying drawings forming a part of this specification, in which similar letters of reference indicate corresponding parts in all the figures.

Figure 1 is a plan view of the improvement, partly in section on the line 1—1 in Fig. 2. Fig. 2 is a side elevation of the same. Fig. 3 is a transverse section of the grip. Fig. 4 is a perspective view of the front axle and one of its bearings; and Fig. 5 is a perspective view of one of the grip jaws.

The improved transportation carriage is mounted to travel on the track A, of gravity plane railroads of any approved construction, and the said carriage is provided with two truck frames B and C connected with each other either rigidly or pivotally so that in the latter case the rear or lower truck B can assume a different angle relative to the incline of the track A. The truck B is provided for this purpose at its front end with eyes B', engaging a transversely extending shaft D, mounted to turn in suitable bearings on the rear end of the front truck C.

The rear truck B is provided at its rear end with track wheels E, secured on a shaft E', mounted to turn in suitable bearings on the truck B. The front truck C is provided with track wheels F, mounted to turn loosely on the eccentric ends $F^2$ of a shaft F', mounted in bearings $F^3$, attached to the front truck C. The shaft F' is fastened in place in the bearings $F^3$ by a set screw $F^4$, screwing in the said bearings. By turning the shaft F', the eccentric ends $F^2$ are raised and lowered, thus raising or lowering the position of the front wheels F relative to the rails of the track A on which the said wheels, as well as the wheels E, travel.

On the rear truck B are secured the transversely-extending track rails G and G', standing about at right angles to the rails of the track A, the upper track rail G being provided at its inside with a guard rail $G^2$, as is plainly illustrated in the drawings. The track rails G and G' are adapted to connect with rails of a side track H, so that a car can be moved from the side track onto the rails G and G' to be supported on the transportation carriage, or a car can be moved from the rails G and G' to a side track.

The front truck C is provided with chains I, connecting with a cable J, serving to pull the transportation carriage on the track A in the usual manner. In order to lock the transportation carriage in position when the rails G and G' connect with a side track, a gripping device K, is provided arranged on the front truck C. This gripping device K is provided with a frame L, secured on the front truck C and extending transversely above the rails of the track A. On the frame L is pivoted at N', a lever N, connected above and below the pivot with links O and O', pivotally-connected with levers P and P', respectively, fulcrumed on the frame L. Each of the levers P and P' is pivotally connected above and below its fulcrum with the arms Q and Q', extending transversely and fitted to slide in suitable bearings on the frame L. The arm Q extends above the respective rail of the track A and past the same while the other arm Q' terminates at the inside of the rail, as plainly shown in Fig. 3.

The outer ends of the arms Q and Q' support gripping jaws or shoes R and R', respectively preferably L-shaped, as plainly shown in Fig. 5 and adapted to engage the head and part of the web of the rail of the track A. It will be seen that when the lever N is moved in the direction of the arrow $a'$, the links O and O' pull on the levers P and P' so that transverse sliding motion is given to the sets of arms Q and Q'. The arm Q of each set moves inward while the other arm Q' moves simultaneously outward, so that the jaws or shoes R and R' are firmly pressed in contact with the opposite sides of the rail, thus clamping the rails and thereby holding the transportation car in position on the main track A.

The lever N is provided with a horizontal extension N², adapted to be taken hold of by the operator for manipulating the said lever. On this horizontal extension N² is fitted to slide a spring pressed pawl S, connected with a hand lever T, pivoted on the extension N² and adapted to be taken hold of by the operator to manipulate the pawl S. The latter is adapted to engage teeth U', formed in one edge of a rod U, extending vertically and pivoted at its lower end on the frame L of the gripping device. The rod U passes through a loop in the horizontal extension N² of the lever N as plainly shown in Fig. 3.

It will be seen that when the operator moves the lever N in the direction of the arrow $a'$, as previously described, the pawl S engages one of the teeth U' on the rod U so as to lock the lever N in position when the gripping jaws R and R' clamp the rail. When it is desired to release the carriage, the lever N is moved upward in the inverse direction of the arrow $a'$, the pawl S having been previously withdrawn from the teeth U'. This movement of the lever N causes the arms Q and Q' to slide in an inverse direction so that the gripping jaws R and R' are moved out of engagement with the rails of the track A. The carriage is then free to be drawn up and let down on the track A of the gravity plane railroad. It is understood that its speed is regulated by the grip device.

When it is desired to raise the gripping jaws R and R' above the rails of the track A, then the shaft F' is turned in its bearings so that the eccentric ends F² move into a lowermost position, thus raising the front truck C and consequently the frame L of the gripping device K.

In order to lock the car to be transported in position on the rails G and G', the shaft D is provided with arms D', extending upwardly on each side of the wheels of the car so as to hold the latter in position on the truck B. The shaft D is also provided with arms D², standing about at right angles to the arms D' and adapted to abut against lugs D³, arranged on the sides of the track A. When the arms D² are in this position, the arms D' are out of the path of the car on the rails G and G', so that the car can be moved to the side track or from the latter onto the carriage, as the case may be. When the arms D² are in engagement with the lugs D³, the carriage is prevented from being drawn upward by the said arms abutting on the lugs D³.

It will be seen that a transportation car constructed in this manner can make a connection with side tracks along the main track A so that cars from the side track can be readily run onto the transportation car or from the latter onto the side tracks as desired. It will further be seen that during the time the change of the car from side track to transportation carriage takes place, the transportation carriage is locked in position by the gripping device shown and described, and that the velocity of the carriage when moving on the plane can be regulated and controlled by the same means.

Having thus fully described my invention, I claim as new and desire to secure by Letters Patent—

1. A transportation carriage provided with a front and rear truck connected with each other and of which the front truck is provided with track wheels having vertically adjustable axes, and track rails held in the rear truck and standing at right angles to the track of the carriage, substantially as shown and described.

2. A transportation carriage provided with a front and a rear truck connected with each other and of which the front truck is provided with vertically adjustable truck wheels, track rails held in the rear truck and standing at right angles to the track of the carriage, and a gripping device on the front truck for locking the carriage in place or controlling its velocity; said gripper being adapted to be raised out of action when the front truck is raised by lowering its wheels, substantially as set forth.

3. A transportation carriage comprising a front and rear truck pivotally connected with each other and of which the front truck frame is adapted to be raised or lowered to change the position of the rear truck, and track rails held on the rear truck and extending transversely at right angles to the path of the carriage, substantially as shown and described.

4. A transportation carriage comprising a front and rear truck pivotally connected with each other and of which the front truck frame is adapted to be raised or lowered to change the position of the rear truck, track rails held on the rear truck and extending transversely at right angles to the path of the carriage, and a gripping device for locking the carriage in place or controlling its velocity, substantially as shown and described.

5. A transportation carriage, comprising a wheeled rear truck, a wheeled front truck connected with the rear truck and having its wheels provided with vertically adjustable axes, and a gripping device held on the said front truck in front of its wheels and raised above the rails by the adjustment thereof, substantially as set forth.

6. A transportation carriage comprising a rear wheeled truck, track rails held on the frame of the said truck and extending transversely at right angles to the path of the truck, a front truck connected with the said rear truck, a shaft mounted to turn in the said front truck and provided with eccentric ends, and wheels mounted to turn on the said eccentric ends, substantially as shown and described.

7. A transportation carriage comprising a rear wheeled truck, track rails held on the frame of the said truck and extending transversely at right angles to the path of the truck, a front truck connected with the said rear truck, a shaft mounted to turn in the said front truck, and provided with eccentric ends, wheels mounted to turn on the said eccentric ends, and means, substantially as described, for fastening the said shaft in its bearings, as set forth.

8. In a car transportation carriage, a gripping device held on the said carriage, and comprising sets of transversely sliding rods each provided with a gripping jaw or shoe engaging the sides of the rail, substantially as shown and described.

9. In a car transportation carriage, a gripping device comprising a frame, a set of arms fitted to slide transversely in the said frame, gripping jaws held on the outer ends of the said arms and adapted to engage the main track rails, and means, substantially as described, for imparting lateral sliding motion to the said sets of arms, the individual arms of each set moving in opposite directions, substantially as shown and described.

10. In a car transportation carriage, a gripping device comprising a frame, a set of arms fitted to slide transversely in the said frame, gripping jaws held on the outer ends of the said arms and adapted to engage the main track rails, means, substantially as described, for imparting lateral sliding motion to the said sets of arms, the individual arms of each set moving in opposite directions, levers pivotally-connected with the said arms and fulcrumed on the said frame, links connected with the said levers, and a hand lever connected with the said links, substantially as shown and described.

11. In a car transportation carriage, a gripping device comprising a frame, a set of arms fitted to slide transversely in the said frame, gripping jaws held on the outer ends of the said arms and adapted to engage the main track rails, means, substantially as described, for imparting lateral sliding motion to the said sets of arms, the individual arms of each set moving in opposite directions, levers pivotally-connected with the said arms and fulcrumed on the said frame, links connected with the said levers, a hand lever connected with the said links, and means, for locking the said lever in place, substantially as shown and described.

ALEXANDER BOWIE.

Witnesses:
JAS. W. BOWIE,
JOHN DAILEY.